Dec. 30, 1952     A. B. SEPPMANN     2,623,541
LOCK AND HILL HOLDER VALVE FOR HYDRAULIC BRAKES
Filed Nov. 20, 1948     2 SHEETS—SHEET 1
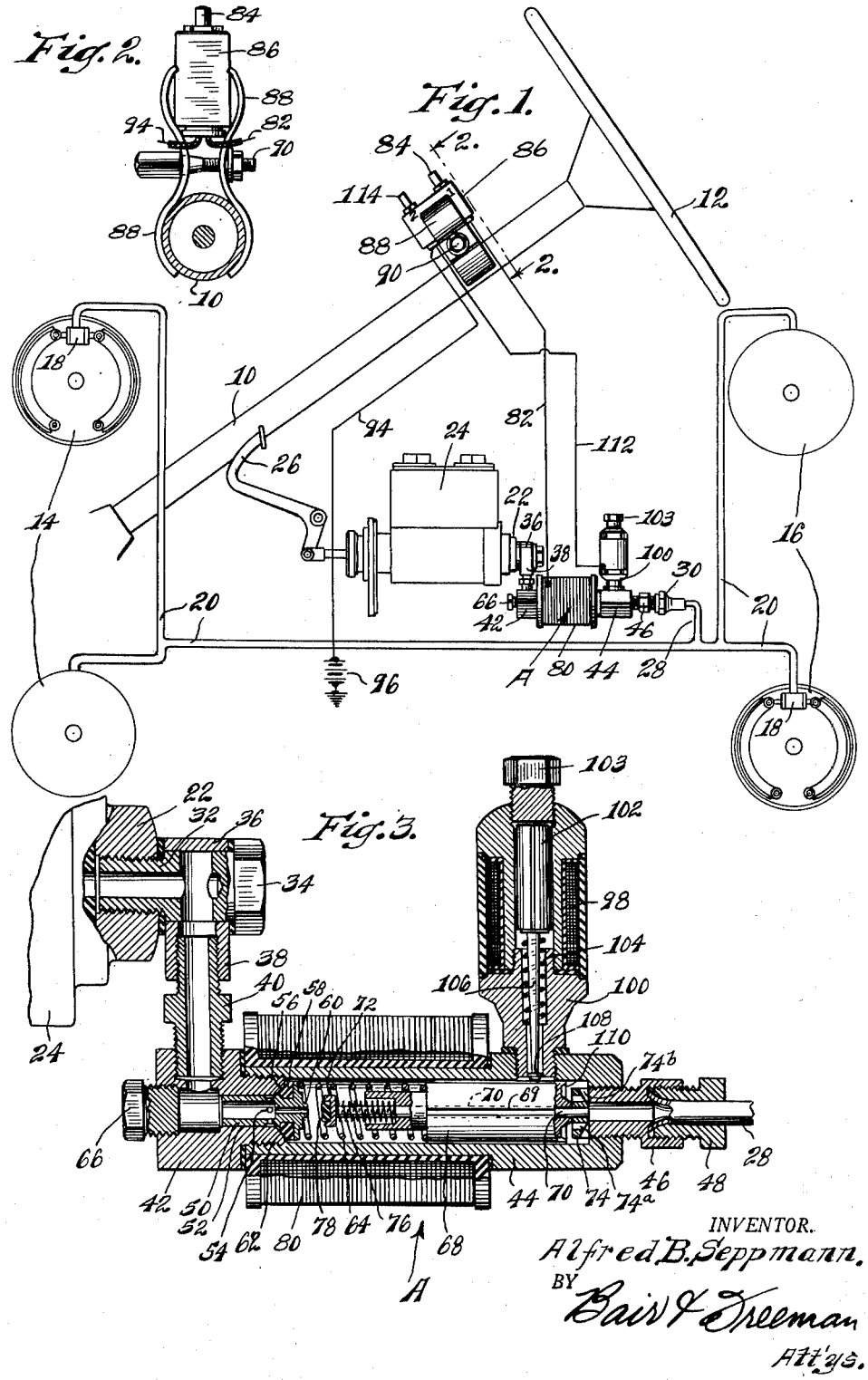
INVENTOR.
Alfred B. Seppmann,
BY Baird & Freeman
Att'ys.

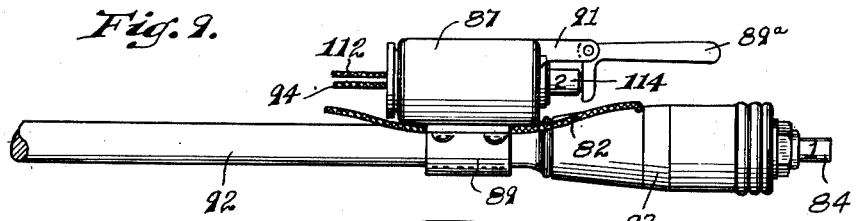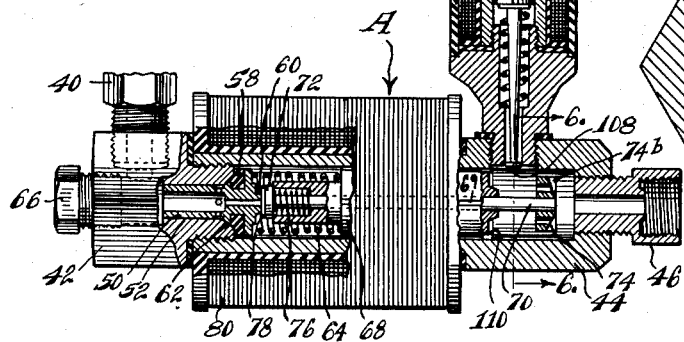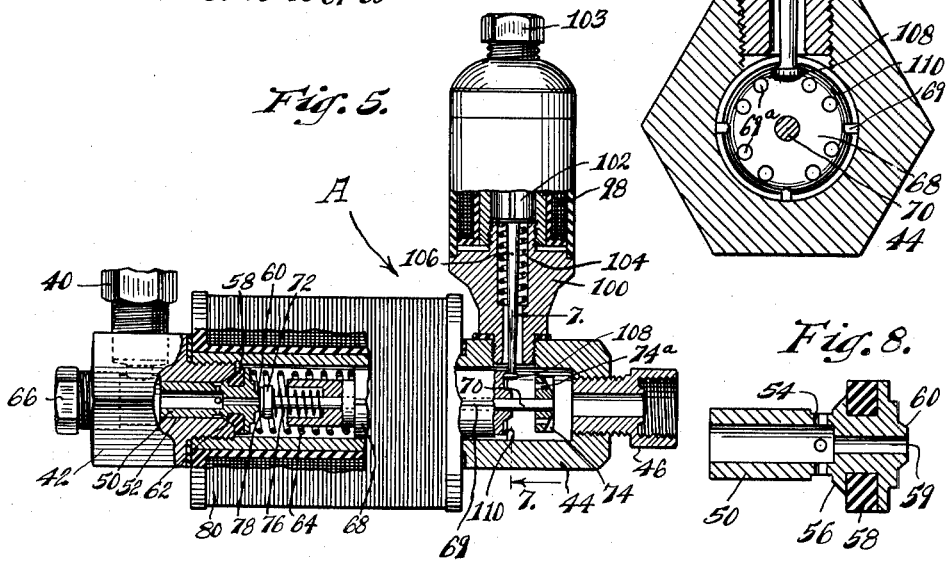

Patented Dec. 30, 1952

2,623,541

UNITED STATES PATENT OFFICE 2,623,541

LOCK AND HILL HOLDER VALVE FOR HYDRAULIC BRAKES

Alfred B. Seppmann, Mankato, Minn.

Application November 20, 1948, Serial No. 61,200

5 Claims. (Cl. 137—598)

1

This invention relates to a means to lock the hydraulic brakes of an automobile, truck or the like in operated position by means of a push button control and to hold them in that position by means of another push button control, after which the second push button can be released, the brakes will remain in the applied position, the brakes being subsequently releasable by pushing the first push button.

One object of the invention is to provide a simple arrangement for electrically operating a brake holder valve of a hydraulic brake system without the necessity of continuing the supply of current to the mechanism after the brakes are once set.

More specifically it is my object to provide a hydraulic valve structure to be interposed between the master cylinder and the brake fluid lines to the brakes of a vehicle, the valve being provided with means to operate the same and means to hold the same in operated position so that it can be released at will.

A further specific object is to provide a hydraulic valve which is normally open, and a solenoid for closing the valve, a second solenoid being provided to lock the valve in the closed position and being releasable by actuation of the first solenoid, thereby simplifying the operations to those required for operating only a pair of push buttons in the proper sequence.

A further object is to provide a brake lock which is reliable in operation and a means to retain it in the locked position so that the brakes will hold of themselves on a hill without the necessity of keeping the brake pedal depressed, the mechanism being operable to readily release the brakes whenever desired.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a diagrammatic view of a hydraulic brake system with my invention applied thereto.

Figure 2 is an enlarged sectional view on the line 2—2 of Figure 1 showing a mounting for the push buttons that control the mechanism of my brake lock and hill holder.

Figure 3 is an enlarged vertical sectional view through the mechanism embodying my present invention and showing the parts in the normal or non-operated position.

Figures 4 and 5 are similar sectional views showing the parts in various operated positions.

Figures 6 and 7 are enlarged detail sectional views on the lines 6—6 of Figure 4 and 7—7 of Figure 5, respectively.

Figure 8 is an enlarged sectional view of a sleeve valve used in my mechanism, and

2

Figure 9 is a plan view of a gear shift lever with push buttons for controlling my mechanism mounted thereon.

On the accompanying drawings I have used the reference numeral 10 to indicate the steering column of an automobile, truck or the like and 12 the steering wheel thereof. The front and rear brakes of the automobile are shown at 14 and 16 more or less diagrammatically and these brakes are of the hydraulic type having the usual actuating cylinders 18. The cylinders 18 are ordinarily connected by piping 20 with an outlet boss 22 of a master cylinder 24, the piston of the cylinder 24 being actuated by a brake pedal 26. The specific pipe of the brake fluid system that connects to the boss 22 is illustrated at 28 and this is cut somewhat shorter and connected to a fitting 30 between which and the boss 22 I interpose my brake lock and hill holder assembly shown generally at A.

The assembly A comprises a hollow stud 32 having a head 34, the stud being threaded into the boss 22 of the master cylinder 24. Interposed between the head 34 and suitably gasketed relative to the boss 22 is a sleeve 36 having a side outlet boss 38. The boss 38 receives a nipple 40 with which a plug 42 is connected, the plug extending into a sleeve 44 that forms the main body of my brake lock and hill holder valve. A fitting 46 is screwed into the sleeve 44 and connects with the brake fluid pipe 28 as by means of a flare engaging plug 48 screwed into the fitting 46 against a flare on the inner end of the pipe.

A sleeve valve 50 is slidable in a bore 52 of the plug 42 and is provided with ports 54, a metal seat 56 and a resilient seat 58 of neoprene or the like as best shown in Figure 8. The sleeve also has an annular valve lip 60 surrounding a passageway 59 through the valve. The seats 56 and 58 are adapted to engage a seat 62 of the plug 42 under the bias of a spring 64. A plug 66 is located in the plug 42 and is removable for gaining access to the sleeve valve 50.

A solenoid plunger 68 is slidable in the valve body 44 and is normally biased to the rearward or right hand position of Figure 3 by the spring 64. The plunger is provided with grooves 69 and holes 69a extending longitudinally through it (see Figure 7). It carries a stem 70 slidable relative to the plunger and having a valve plug 72 on its forward end and a head 74 on its rear end provided with perforations 74a and radial grooves 74b. A light spring 76 is interposed between the valve head 72 and the plunger 68 to normally bias the head 72 toward the valve lip 60. The head 72 has a resilient disc-like insert 78 for engagement at times with the valve lip.

A solenoid coil 80 surrounds the valve body 44 in an appropriate position for pulling the plunger 68 toward the left when the coil is energized.

One end of the coil is grounded and its other end is connected by a wire 82 to a push button 84 which in Figure 1 I have labeled "1." The push button 84 is mounted in a housing 86 which may be secured to the steering column 10 by clamp plates 88 and a clamp screw 90. Instead of the steering column, the push buttons may be mounted on the dash (not shown) or on the gear shift lever 92 as shown in Figure 9 and as will hereinafter be described.

Current is supplied to the push button 84 by a wire 94 extending from the starting and lighting battery 96 of the vehicle. One side of this battery being grounded in the usual manner so as to complete the circuit to the grounded end of the solenoid coil 80.

A second solenoid coil 98 is mounted on a fitting 100 screwed into the side of the valve body 44 and a plunger 102 is mounted therein and normally biased to the raised position shown in Figure 3 by a spring 104. The plunger has a downwardly extending stem 106 terminating in a head 108 which is adapted to assume a position back of the plunger 68 as in Figure 5 when the coil 98 is energized. The plunger 68 has a cylindrical flange 110 to engage the head 108 at times as will hereinafter appear.

The solenoid coil 98 is adapted to be energized when current is conducted to it by a wire 112 extended to a second push button 114 mounted in the housing 86 and labeled "2." This push button likewise has its other terminal connected with the wire 94.

In Figure 9 I show a modification wherein the push button 84 is mounted in a knob 93 of a gear shift lever 92 and the push button 114 is mounted in a housing 87 secured to the gear shift lever as by a strap 89. A bell crank lever 89a is pivoted to a bracket 91 of the housing 87 for convenience in operating the push button 114. This type of installation is also suitable for the upper end of that type of gear shift lever which extends upwardly from the floor boards of the vehicle.

*Practical operation*

In the operation of my device the parts are normally in the position of Figure 3 and in no way interfere with the normal operation of the brakes. When the brake pedal 26 is depressed brake fluid from the master cylinder 24 flows through the nipple 40 and opens the sleeve valve 50 against the action of the spring 64 in much the same manner as any check valve is opened. Some of the fluid will flow through the passageway 59 of the sleeve valve 50 itself and issue from the valve lip 60.

The longitudinal grooves 69 and holes 69a of the plunger 68 permit the fluid to flow freely past it and the perforations and radial grooves 74a and 74b in the head 74 also permit free flow of the fluid into the fitting 46. When the brake pedal is released the valve seats 56 and 58 will engage the valve seat 62 and the brake fluid will return through the passageway 59 of the sleeve valve 50.

In the event that it is desirable to lock the brakes in the applied or set position, the brake pedal 26 is first depressed for setting the brakes and then the first push button 84 is depressed which moves the plunger 68 forwardly to the position of Figure 4 causing the valve disc 78 to seat against the lip 60 and seal the brake fluid against return flow even when the brake pedal is released. This locked condition will obtain as long as the first push button is held depressed and the brakes will be released when the push button is released.

There are many instances, as when stopping on a hill, that it is desirable to hold the brakes in the applied position and it is desirable to do this without having to hold the push button 84 depressed. Also it is undesirable to energize the solenoid 80 for too long a period of time because of undue heating of the coil and excessive drain on the battery 96.

I therefore provide the second solenoid 98 which may be operated after the first push button is depressed by depressing the second one 114. This causes the stem 106 and its head 108 to be moved downwardly from the position of Figure 4 to the position of Figure 5 but the plunger 68 remains in the position of Figure 4 until the first push button 84 is released after depressing the second push button. Thereupon the plunger 68 is moved rearwardly due to the action of the spring 64 and the flange 110 engages over the head 108 of the plunger 102 so that when the second push button is released the spring 104 cannot return the plunger upwardly.

This leaves the valve 60—78 locked closed as the spring 76 expands slightly to keep these parts engaged when the plunger 68 moves from the position of Figure 4 to the position of Figure 5. Accordingly the brakes will be held in the applied position as long as the parts remain in the position shown in Figure 5.

When it is desirable to subsequently release the brakes, the first push button 84 is depressed which again moves the plunger 68 forwardly as to the position of Figure 4, thus releasing the plunger 102 so that it is returned upwardly as in Figure 4 by the spring 104. Then when the first push button 84 is released again the plunger 68 moves to the position of Figure 3 for releasing the brakes, the brake fluid then of course returning through the passageway 59 in the sleeve valve 50 to the master cylinder.

An important feature of my construction resides in the design of the plunger 68 so that it must travel some distance from the position of Figure 3 before the valve 60—78 closes in a position intermediate those positions illustrated in Figures 3 and 4 under action of the spring 76. There is then further movement of the plunger while the space is taken up between its forward end and the back of the valve plug 72, the spring 76 all during such further movement keeping the valve parts 60 and 78 engaged. Finally the forward end of the plunger 68 strikes the valve plug 72 as in Figure 4 and this imparts a hammer blow to effect the final seating of the valve 60—78 and also effects a hammer blow of the valve seats 56 and 58 which are normally seated under the action of the spring 64, against the seat 62 to insure holding the brake fluid against any possible return to the master cylinder while my lock and hill holder valve is in holding position.

Comparing Figure 8 with Figure 3 it will be noted that the resilient seat 58 has a different shape and this results in it seating first and thereafter the metal seat 56 seating against 62 which prevents the entire load being put on the resilient seat 58 which would soon cause it to crush down and require renewal. This two-stage seating accordingly lengthens the life of this valve many fold and is an important feature of the valve along with the hammer-action for seating the valve. Likewise when the valve is opened the plunger 68 will gain momentum under the action of the spring 64 until its rear end hammers against the head 74 for effecting an unseating at 60—78 with a force much greater than otherwise. I am thereby assured of positive seating and unseating due to the hammer-action while at the same time a relatively small solenoid coil 80 is sufficient for the purpose and entails less current drain than most types of coils used for this purpose.

My arrangement also eliminates the necessity of keeping a solenoid energized for an excessive period of time and this is accomplished by the second solenoid which need not be very large as it actuates only the plunger 102 instead of a hydraulic valve as in the case of the plunger 68.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a brake control device, a valve between a master cylinder and a brake fluid line, a plunger having a lost motion connection with said valve for closing it with hammer action, a spring for returning said plunger from valve-closed position, said plunger having a recessed shoulder, a second plunger for locking said first plunger against return movement, a second spring for returning said second plunger from first plunger-locking position, the recess of said shoulder of said first plunger being engageable with said second plunger to lock it against return movement by said second spring when said first plunger partially returns after being moved to close said valve, and to unlock said second plunger when said first plunger is moved again in the valve-closing direction, and a manual control for each of said plungers to move them in opposition to their return springs.

2. In a hydraulic brake control device, a valve for interposition between a master cylinder and a brake fluid line, a first plunger for closing said valve, a first spring for returning said first plunger for opening said valve, said first plunger having a recessed shoulder, a second plunger for engaging behind said shoulder for thereby locking said first plunger against return movement, a second spring for returning said second plunger to unlock said first plunger, the recess of said shoulder of said first plunger being engageable under action of said first spring with said second plunger to lock it against return movement by said second spring when said first plunger partially returns after being moved to close said valve, said shoulder of said first plunger dis-engaging said second plunger when the first plunger is moved again in the valve closing direction, and means for moving each of said plungers in opposition to their spring returned directions of movement.

3. In a brake lock and hill holder device, a valve body, a valve therein adapted to be unseated when brake fluid flows therethrough to the brakes and to be seated upon reverse flow, a passageway therethrough to permit reverse flow of fluid, a pair of solenoid coils, a valve element adapted for seating on said passageway, a plunger having a lost motion connection with said valve element to close it against said passageway when one of said solenoid coils is energized, means to bias said first plunger to return from valve-closing position, said plunger having a shoulder, a second plunger for positioning back of said shoulder and thereby locking said first plunger in the closed position of said valve element relative to said passageway, said second solenoid coil actuating said second plunger to such position, means biasing said second plunger to return from its locking position, said shoulder of said first plunger being recessed to engage said second plunger and lock it against retraction when said first solenoid coil is de-energized following energization thereof, and means for controlling the supply of current to each of said solenoids independently and in the desired sequence.

4. In a brake lock and hill holder of the character disclosed, a valve unit adapted to be interposed between a master cylinder and a brake fluid line comprising a valve seat and a valve element which permits normal flow of brake fluid in both directions through said valve seat when said valve element is spaced therefrom and prevents such flow when said valve element is seated thereon, a solenoid having a plunger for seating said valve element when said first solenoid is energized, a spring for returning said plunger when said first solenoid is de-energized, said plunger having a spring extended, lost motion connection with said valve element for seating it with hammer action, a second solenoid having a second plunger for locking said first plunger in valve-closed position when said second solenoid is energized following energization of said first solenoid, a second spring for returning said second plunger when said second solenoid is de-energized, said first plunger engaging said second plunger when said first solenoid is de-energized and while said second solenoid is energized to hold said first plunger against return movement as long as both of said solenoids then remain de-energized, said first plunger when the first solenoid is re-energized, disengaging said second plunger to permit it to be spring returned from its locking position with respect to said first plunger.

5. In a valve structure of the character disclosed, a unit adapted to be interposed between a master cylinder and a brake fluid line comprising a valve seat and a valve element which permits normal flow of brake fluid in both directions through said valve seat when said valve element is spaced therefrom and prevents such flow when said valve element is seated thereon, a first solenoid having a plunger for seating said valve element when said first solenoid is energized, a spring for returning said plunger when said first solenoid is de-energized, a second solenoid having a second plunger for locking said first plunger in valve-closed position when said second solenoid is energized, a second spring for returning said second plunger when said second solenoid is de-energized, said first plunger upon being spring returned after said first solenoid is de-energized and while said second solenoid is energized engaging said second plunger to hold it against return movement by its return spring as long as said first solenoid remains de-energized.

ALFRED B. SEPPMANN.

REFERENCES CITED

The following references are of record in the file of this patent:

UNITED STATES PATENTS

| Number | Name | Date |
|---|---|---|
| 775,054 | Waterman | Nov. 15, 1904 |
| 1,924,251 | McGuire | Aug. 29, 1933 |
| 2,220,465 | Spotz | Nov. 5, 1940 |